United States Patent [19] [11] 4,126,202
Hern [45] Nov. 21, 1978

[54] VEHICLE CONTROL BOX MODULE

[75] Inventor: John F. Hern, Southfield, Mich.

[73] Assignee: Massey-Ferguson, Inc., Detroit, Mich.

[21] Appl. No.: 817,477

[22] Filed: Jul. 20, 1977

[51] Int. Cl.² .............................................. B62D 25/14
[52] U.S. Cl. .................... 180/89.12; 180/90
[58] Field of Search ............... 180/77 R, 89.1, 89.11, 180/89.12, 90, 90.6; 296/35 R, 102, 70, 28 C

[56] References Cited

U.S. PATENT DOCUMENTS

| | | | |
|---|---|---|---|
| 2,197,290 | 4/1940 | Baker et al. | 180/90 X |
| 3,656,799 | 4/1972 | Malm et al. | 180/89.12 X |
| 3,732,941 | 5/1973 | Davis | 180/89.1 |
| 3,741,329 | 6/1973 | Davis et al. | 180/89.1 |
| 3,789,945 | 2/1974 | Hansen | 180/90 X |
| 3,831,704 | 8/1974 | Zuege | 296/28 C |
| 3,844,374 | 10/1974 | Downey | 180/90.6 |
| 4,050,735 | 9/1977 | Molnar | 296/102 |

Primary Examiner—Kenneth H. Betts
Attorney, Agent, or Firm—William R. Nolte

[57] ABSTRACT

A control module for tractors in which the various controls for operating the tractor are supported in a group for convenient operation by the operator of the tractor and may be installed as a unit in the tractor relative to an operator station that is flexibly supported relative to the main body of the tractor. The various controls are resiliently and flexibly connected to control various devices making up the unsuspended main body of the tractor. The tractor may have either an enclosed cab or an open platform forming an operator station resiliently mounted to the unsuspended main body of the tractor to inhibit the transmission of vibration, shock loads and noise, and the module is supported from the station to minimize relative movement between the operator and the controls. The controls are connected by flexible means serving to dampen the transmission of vibrations and the like from the unsuspended main body of the tractor.

10 Claims, 7 Drawing Figures

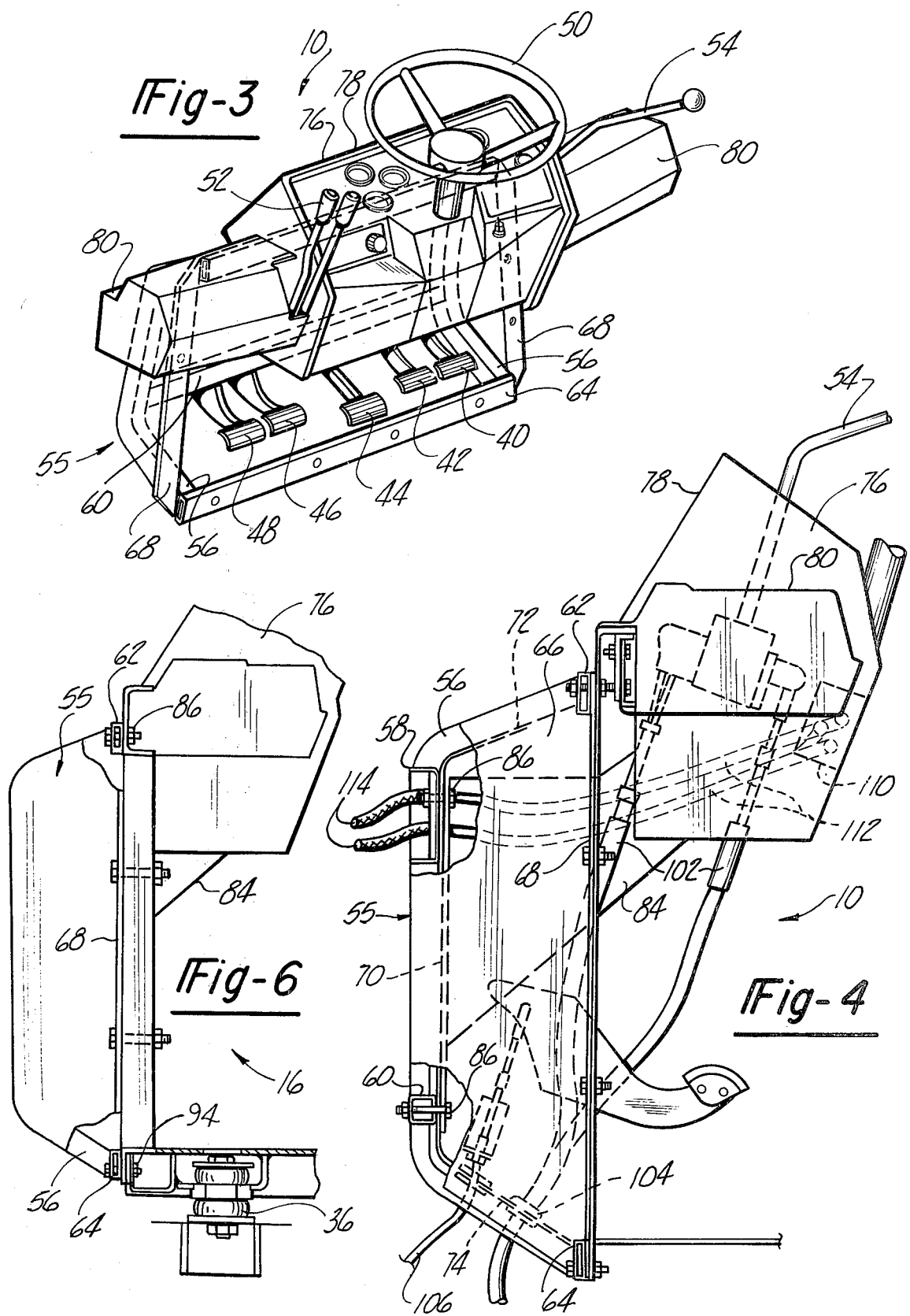

VEHICLE CONTROL BOX MODULE

The present invention relates to vehicles, such as tractors and more particularly to a control module, including controls positioned for use from the operator's station of such vehicles.

Tractors are manufactured so that an operator controls the tractor from a station in the form of either an open platform or an enclosed cab. Such operator stations usually are resiliently suspended relative to the main body of the tractor in an effort to dampen vibration and shock loads that otherwise would be transmitted to the operator. The main body of the tractor includes the engine, the transmission and rear axle drive housing, all of which are supported in an unsuspended manner from ground-engaging wheels. Also, various implements which are to be operated by the tractor, typically are supported in a similar manner from the main body. The engine, transmission, wheels and implements, all of which are unsuspended, must be controlled from the operator station which has movement relative to the main body because of the resilient suspension.

It is desirable and is an object of the invention to minimize relative movement between the controls of the tractor and the operator. Also, it is an object to provide a control arrangement which may be mounted relative to the resiliently supported operator station and still be connected to the unsuspended portions of the tractor in a manner such that vibrations and noises are not transmitted through the controls to the operator station. Also, with tractors which are available either with a platform or with a cab as an operator's station, it is highly desirable that the same control assembly be used for either type of operator station and be assembled and installed substantially as a completed unit or module.

The objects of the invention are accomplished by a control module for tractors in which the various controls for operating the tractor are supported in a group for convient operation by the operator of the tractor and which may be installed as a unit relative to an operator station that is flexibly supported relative to the main body of the tractor and the various controls are resiliently and flexibly connected to control the various devices making up the unsuspended main body of the tractor. The tractor may have either an enclosed cab or an open platform forming an operator station resiliently mounted to the unsuspended main body of the tractor to inhibit the transmission of vibration, shock loads and noise, and the module is supported from the station to minimize relative movement between the operator and the controls. The controls themselves are connected by flexible means which also serve to dampen vibrations and the like to the various devices to be operated on the unsuspended main body of the tractor.

These and other objects of the invention will be apparent from the following description and from the drawings in which:

FIG. 3 is a perspective view of a control module of a vehicle as it would appear detached from a tractor;

FIG. 4 is a side elevation, partly in section, of the control module seen in FIG. 1 installed in the cab of a tractor;

FIG. 6 is a side elevation showing the control module attached to a platform-type of operator station.

Figure 1:
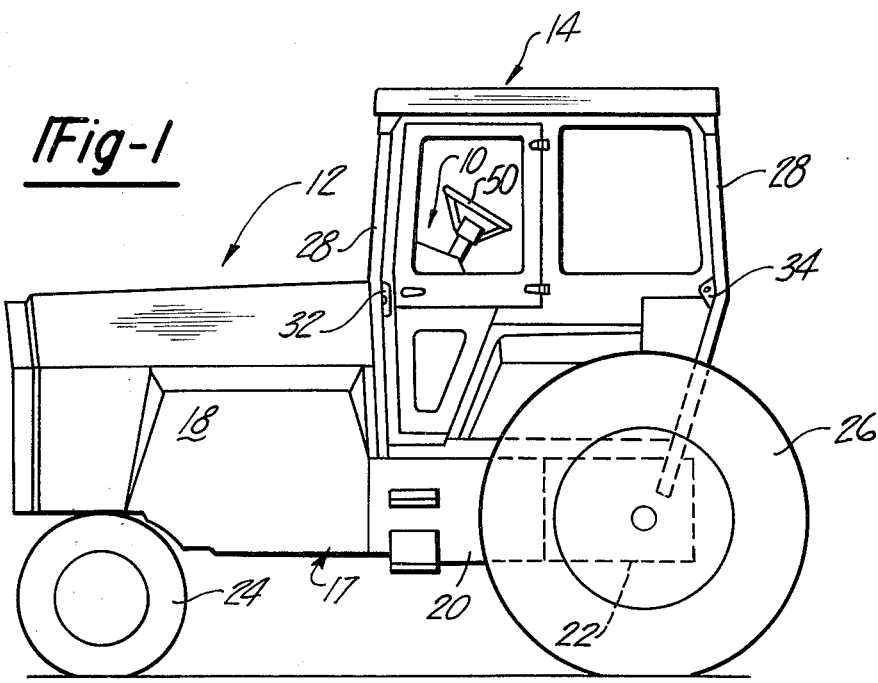
FIG. 1 is a side elevation of a tractor having a cab forming an operator station.
Figure 2:
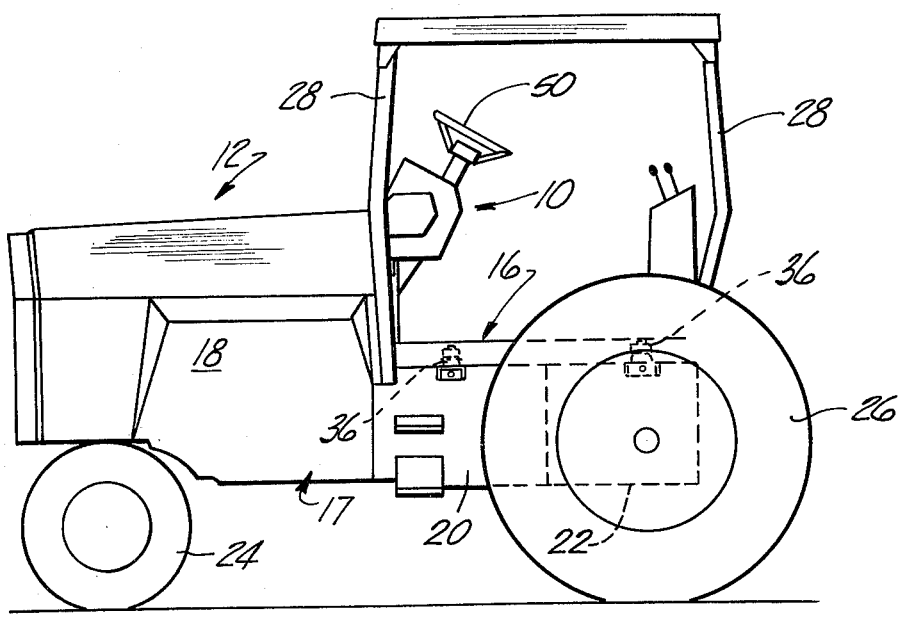
FIG. 2 is a side elevation of a tractor having a platform type operator station.

Referring to the drawings, a control module embodying the inventive concept is designated generally at 10 and is adapted for use with a tractor 12 having an operator station in the form of a cab 14 as seen in FIG. 1 or an operator station in the form of a platform 16 as seen in FIG. 2.

The tractor 12 has a main body 17 which may be considered as including an engine 18, a transmission 20 and a rear axle housing 22, all of which are supported in an unsuspended manner from steerable front ground-engaging wheels 24 and driving, rear ground-engaging wheels 26.

The tractor 12, whether equipped with a cab 14 or a platform 16, is provided with a roll-over protection system, including roll-over bars 28, connected to the main body 17 of the tractor. As seen in FIG. 1, the cab operator station 14 is resiliently supported from the roll-over bars 28 by a front suspension member 32 and rear suspension member 34. The suspension members 32 and 34 isolate the operator station 14 from vibration, shock loads and noise generated by the main body components and implements which otherwise would be transmitted to the cab operator station 14.

As seen in FIG. 2, the platform-type operator's station 16 is suspended from the main body by resilient mounting members 36 seen also in FIG. 6. In this case the platform 16 is resiliently supported from the main body 17 and the members 36 act to isolate vibration, shock loads and to some degree, noises from being transmitted to the operator station.

Both the cab 14 and the platform 16 are provided with the control module 10 which is used to support identical controls for controlling the various operations of the tractor 12 such as steering, engine speed, braking, transmission operation and implement control.

A variety of controls may be provided in the module 10 and by way of example, the module shown in FIG. 1 includes foot pedals 40 and 42 for controlling forward and reverse drive as well as engine speed. Such controls are known as instant reverse transmission controls by which an operator can control the direction of drive and have his hands free for steering and operating other controls. A foot pedal 44 may be provided for controlling a differential lock and foot pedals 46 and 48 may be used for other controls such as braking of the rear driving wheels to permit steering and leave the hands free for other control operations. Also, by way of example, the controls include a steering wheel 50, manual transmission levers 52 and an implement control lever 54.

The control module 10 includes a generally boxlike structure 55 having opposite side frame members 56 held in spaced apart relationship by an upper channel shaped, reinforcing member 58 and lower reinforcing member 60. The upper perimeter of an open end of the box-like structure 55 is defined by an upper support 62 and the lower perimeter is defined by a lower support 64. The side frames 56 support side panels 66 which form side walls of the box structure 55. The side panels 66 are formed with flanges 68 adjacent the perimeter of the opening to the box 55. Similarly, a forward wall 70, an upper inclined wall 72 and a lower inclined wall 74 are formed of a single piece of sheet or plate metal to form the bottom and opposite sides of the box 55. The various components forming the box are all welded together to form a unitary rigid structure.

The box-like structure 55 supports a control console 76 incorporating various gauges and instruments of the type usually found in motor vehicles and tractors. A shroud 78 surrounds the console 76. A pair of housings 80 are attached to opposite sides of the control console 76 to conceal various devices such as mechanisms operated by the hand operated levers 52 and 54. The instrument panel 76 and shroud 78 are supported relative to the box-like structure 55 by a pair of brackets 84 bolted as indicated at 86 to the wall 70.

Figure 5:
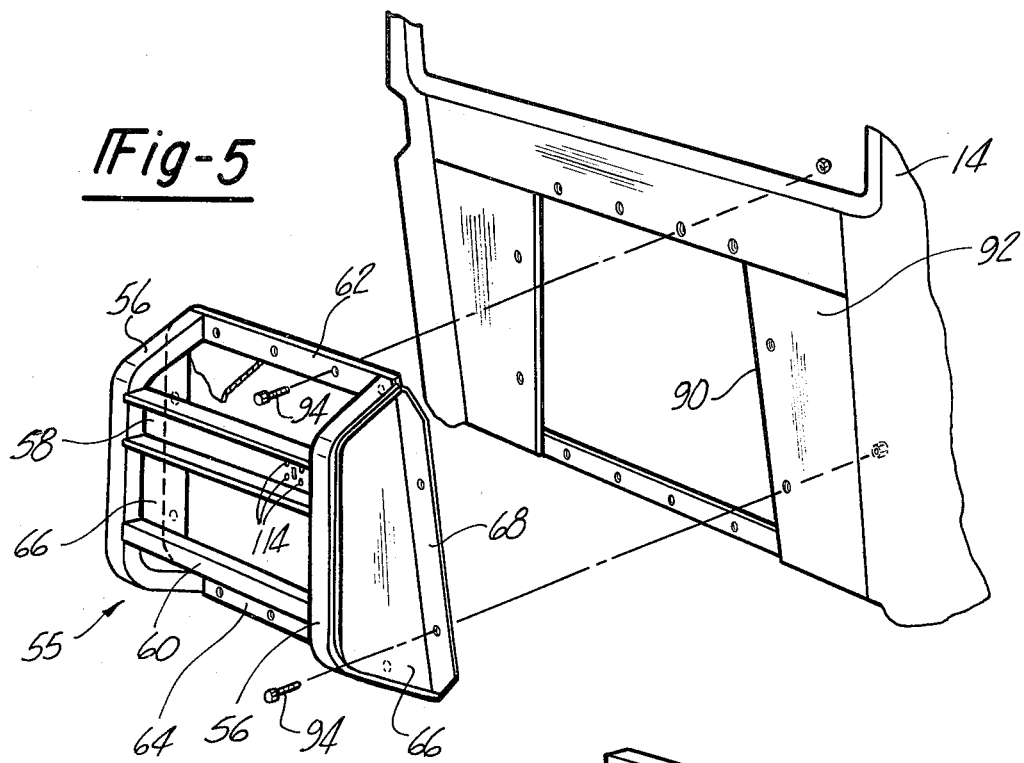
FIG. 5 is an exploded view showing a portion of the module in its relationship to the firewall of a cab forming an operator station.
Figure 7:
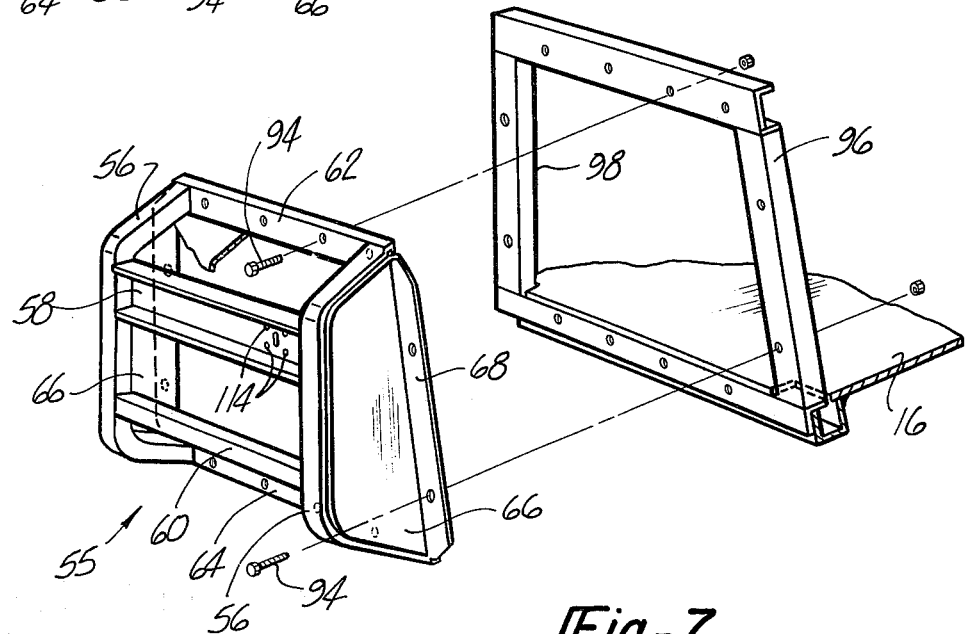
FIG. 7 is an exploded view showing a portion of the control module and its relationship to the firewall of a platform-type operator's station.

The entire control module 10 incorporating the steering wheel and various foot pedals 40, 42, 44, 46 and 48 and levers 52 and 54 may be attached as a unit to a selected operator station in the form of the cab 14 or the platform 16. As seen in FIGS. 5 and 7, the box-like structure 55 is illustrated without the control console 76 in the interest of simplicity. However in actual practice the box 55 is positioned with the console 76 and steering wheel 50 attached by inserting the wheel 50 and console 76 through an opening 90 in a forward wall or bulkhead 92 of the cab 94. Thereafter the box 55 may be secured to the bulkhead 92 by means of bolts 94 passing through the flanges 68 and upper and lower support 62 and 64. The housing members 80 may be attached to opposite sides of the console 76. Similarly, the platform-type station 16 of the tractor 12 has a forward frame or bulkhead 96 defining an opening 98 conforming in size to the opening in the box-like structure 55. The box-like structure 55 is secured in position to the bulkhead 96 by means of bolts 94.

After the box-like structure 55 is secured to a selected one of the operator's stations, that is, the tractor cab 14 or the tractor platform 16, the various control members in the form of the levers, pedals, and steering wheel may be connected to the instrumentalities being controlled. For example, in the case of the loader control lever 54, flexible push-pull cables 102 seen in FIG. 4 may be inserted in the bottom wall 74 of the box-like structure 55 through openings guarded by grommets 104. Similarly, the various foot pedals 40, 42, 44, 46 and 48 may be connected by way of flexible push-pull cables 106 to such devices as the throttle and transmission. The steering wheel 50 controls a rotary valve 110 having hydraulic lines 112 extending from the valve 110 to the wall 70. The ends of the lines 112 pass through the upper reinforcing member 58 as seen in FIGS. 5 and 7 and the ends may be connected to flexible hydraulic conduits 114 seen in FIG. 4 communicating with hydraulic cylinders (not shown) associated with the front steerable wheels 22 of the tractor 12. The various arrangements connecting the control mechanisms with the controlled mechanisms whether in the form of push-pull cables 102 and 106 or hydraulic conduits 114, form flexible means connecting controls in the operators station with controlled devices forming part of or mounted on the unsuspended main body 17.

The operator's stations 14 and 16 are resiliently supported relative to the tractor main body 17 and as a consequence move relative thereto. The control module 10 which is supported directly from and installed as a unit relative to the operator's station moves with the operator's station so that there is a minimum of relative movement between the operator and the controls which are conveniently arranged and positioned for use. The reduction of relative movement is of considerable assistance when the vehicle is being operated on rough terrain and there is a maximum of relative movement between the operator stations 14 or 16 and the main body 17. The relative movement is accomodated in the control system by flexible connections between the controls and the controlled devices which also aid in isolating vibrations and shock loads.

I claim:

1. A tractor comprising a main body including an engine and transmission, the main body in unsuspended relationship to ground-engaging wheels, an operator's station resiliently supported relative to said main body, said operator's station including a bulkhead at a forward portion thereof, an opening in said bulkhead, a control module including an open box positioned on said bulkhead on the side opposite said operator's station to close said opening, controls for said engine, transmission and wheels supported relative to said box and terminating at the other side of said bulkhead, and means connecting said controls to said engine, transmission and wheels and permitting relative movement of said box and main body.

2. The combination of claim 1 in which the opening in said box faces and is in alignment with the opening in said bulkhead.

3. The combination of claim 1 in which some of said controls are foot pedals pivotally mounted within said box and projecting through said opening.

4. The combination of claim 1 in which said means connecting said controls to said engine and transmission include push-pull cables.

5. The combination of claim 1 wherein said bulkhead is a wall of an enclosed cab structure.

6. The combination of claim 1 in which said bulkhead is rigidly mounted on a forward portion of an open platform.

7. The combination of claim 1 wherein said module includes a control console attached to said box and disposed at said other side of said bulkhead.

8. The combination of claim 1 in which said means connecting said controls to said wheels include hydraulic conduits.

9. The combination of claim 1 in which said tractor includes roll-over protection structure means and wherein said operator's station is resiliently supported relative to said main body for movement relative to said roll-over protection structure means.

10. A tractor comprising a main body including an engine and transmission all supported in unsprung relationship relative to ground-engaging wheels, a selected operator station in the form of either an enclosed cab or open platform, mounting means resiliently supporting said selected operator station relative to said main body, a control module including controls for operating said engine and transmission and for steering, said operator's station including a bulkhead, attaching means supporting said module on said bulkhead on the side opposite to said operator station with said controls being accessible at said operator station, and flexible means connecting controls of said control module to said engine, transmission and wheels.

* * * * *